June 21, 1927.

M. R. McDANAL 1,633,117

METHOD OF AND APPARATUS FOR PRODUCING BIFOCAL LENSES

Filed June 21, 1921

M. R. McDanal  INVENTOR.

BY

Mason Fenwick Lawrence,
ATTORNEYS

Patented June 21, 1927.

1,633,117

UNITED STATES PATENT OFFICE.

MICHAEL R. McDANAL, OF DENVER, COLORADO.

METHOD OF AND APPARATUS FOR PRODUCING BIFOCAL LENSES.

Application filed June 21, 1921. Serial No. 479,295.

This invention relates to new and useful improvements in lenses, and more particularly in the method of and apparatus for manufacturing lenses, the main object of the present invention being the provision of an improved and simplified method of so molding and shaping lens blanks that at least one of the molded surfaces shall retain its finish or polish unaffected by the molding operation except at points not within the confines of the field or respective fields to be produced in the lens.

Another object of my invention is the provision of means for forming the desired curvature in a lens without exerting pressure on any portion of the polished surface of the lens blank within the confines of the field or fields desired to be formed therein.

Another object of this invention is the provision of an improved and simplified method of producing bifocal lenses and limiting or narrowing the field of distortion between the two differently focused fields of the lens.

With the above and other objects in view the invention consists in the novel features, steps, construction, combination and arrangement of parts hereinafter more fully set forth, pointed out in the claims and shown in the accompanying drawings in which:

Figure 1:
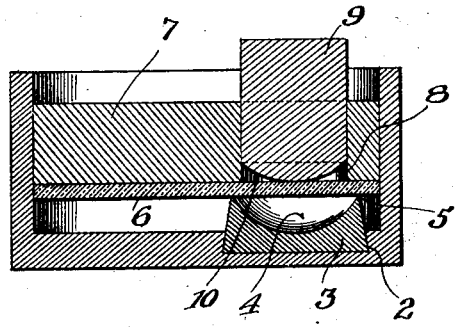
Figure 1 illustrates in diametrical section, a mold showing a lens in position prior to the molding operation.

In carrying out my invention in the manner now found to be preferable, I provide a body member 1, open at its upper end and provided in its bottom portion with a recess 2 adapted to receive supporting member 3. This supporting member may be of any suitable form but preferably, because of rigidity and simplicity of manufacture, of the general form of a block as indicated in the drawing having a concavity formed in its upper surface as shown at 4. The particular requirement of this supporting member is that it shall have at its top an annular sharp edge 5 and the supporting member is to be so constructed that no pressure of any nature sufficient to affect the polished surface of the lens shall come in contact with that surface except at the said annular sharp edge 5.

Figure 2:
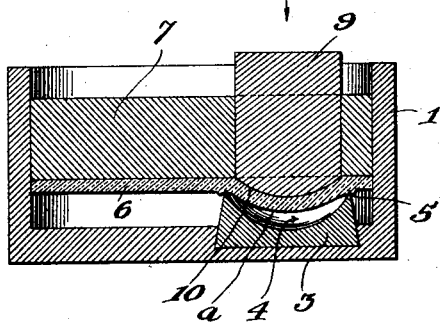
Figure 2 is a similar view showing the desired curve produced in the body of the lens.
Figure 3:
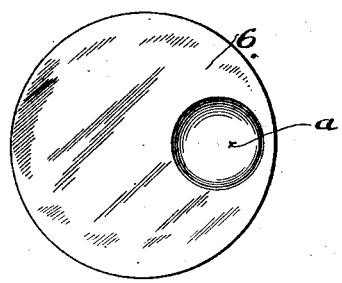
Figure 3 is a top plan view of the lens after being molded.

In order to retain the lens blank 6 in its proper relative position during the molding operation, a guide plate 7 is arranged within the body 1 and adapted to rest upon the upper unpolished surfaces of the lens 6, it being understood that the under surface of the lens 6 which rests upon the annular rim 5 of member 3 is in its polished or finished condition. This plate 7 is provided with a transverse opening 8 through which the plunger 9 operates to contact with the upper unfinished surface of the lens blank. It will be understood that the lens blank 6 must be in a heated or semi-molten condition at the time the molding operation takes place so that when the plunger 9 is forced downwardly against the lens blank as illustrated in Figure 2, that portion of the lens with which the plunger contacts will readily conform to the convex lower end 10 of the plunger 9, and produce upon the lens a second curved surface $a$ of a different dioptric from the main body of the lens. The supporting member 3 must be so constructed that it will not contact with the polished surface of the lens at any point within or without the confines of the field desired to be formed in the lens and it must be so formed that within the concavity there will be no air pressure or other condition which would affect the polished surface of the portion of the lens within the concavity. This is accomplished by making the concavity sufficiently deep as indicated in the drawings. From this it will be apparent that by my method I can form a lens having a plurality of fields of different focii all formed on the same surface of the lens blank and of a single piece.

Attention is also called to the fact that when the plunger 9 contacts with the lens blank 6, forcing a portion of the same downwardly into member 3, the annular edge 5 of the supporting member 3 will limit and confine the bending of the lens by the plunger, to that portion of the lens within the annular edge. Within this limit the unfinished side of the lens will conform to the shape of the plunger. Outside this limit it will retain its original shape. The edge itself may make some indentation or depression along its line of contact with the lens and at the sides of this indentation or depression the glass may bulge slightly or form a slight ridge as indicated and shown to a greatly exaggerated degree in Figure 2. In practice, however, by reason of the sharp edge of the supporting member used, this trench and ridge are so small and fine as to be imperceptible to the naked eye of the average person and their effect is not substantially detrimental. Only an expert examining the lens critically will be able to discover it.

It is recognized that the depression and ridge are undesirable but it is believed that they are much less undesirable than a wide field of distortion between the fields of vision in the lens and that the method whereby I narrow the field of distortion, as above described, is a new and useful improvement notwithstanding the depression and ridge.

Figure 5:
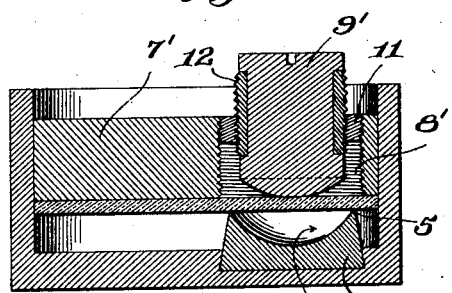
Figure 5 is a diametrical sectional view, illustrating a slightly modified form of mold plunger.
Figure 4:
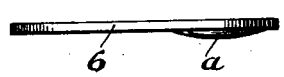
Figure 4 is a side elevation of the lens.

In Figure 5, I have illustrated a slightly modified form of the invention wherein the opening 8' formed within the guide plate 7' is interiorly threaded and arranged therein is a ring 11 threaded both interiorly and exteriorly whereby to engage with the threads in the opening 8' and the threaded sleeve 12 carried by the plunger 9'. From this it will be apparent that plungers provided with various convex shapes at their lower ends may be used in forming different sized curved surfaces upon the lens blanks. It will be apparent that by interchanging different sized rings 11, the different sized plungers can be used in connection with the same guide plate 7'. It will be understood that the size of the annular edge 5 is changed according to changes made in the size of the plunger. In each case it may be preferable that the annular edge be somewhat larger than the plunger, the fact that there may be such a difference in size being clearly indicated in the drawings and the degree of this difference is determined by various factors, one of which is the thickness of the lens blank.

Figure 6:
Figure 6 is a side elevation of a modified form of mold.

In Figure 6, I have illustrated means whereby the second curved surface may be formed within the body of the lens by heating the lens blank 6ᵃ and placing the same, when in a molten condition, upon the mold 13 which is provided with a convex raised portion 14. The raised portion 14 serves the same purpose in this case as the plunger 9 serves in the operations illustrated in Figures 1, 2 and 5. In the one case we have the upward pressure or resistance of the raised portion or plunger 14 opposing the downward movement of the lens resulting from its own weight. In the other case we have the positive downward pressure of the plunger upon the lens. As a result of the operation indicated in Figure 6 a bifocal lens would be formed with a wide field of distortion between the two fields of vision. It is obvious that this field of distortion may be narrowed and limited, in the same manner as above described, by applying to the upper side of the lens blank 6ᵃ, opposite the raised portion 14 of the mold, an annular sharp edge such as 5. By this application, the same result would be produced as by the operations in Figures 1, 2 and 5. In both cases the polished surface of the lens which is the under surface in Figures 1, 2 and 5 and the upper surface in Figure 6, remains untouched and uninjured except at the line of the annular edge 5 and except for the depression or ridge above described.

From the above description taken in connection with the accompanying drawings, it will be readily apparent that I have provided a new and improved method for manufacturing lenses and especially bifocal lenses, whereby to produce a lens having two surfaces of different dioptrics without injuring one of the surfaces which may have been previously polished ready for commercial use and also providing means whereby to reduce the field of distortion between the two surfaces. It will be obvious that the same method or principle may be applied to the manufacture of single focal lenses, by making the plunger and the annular edge 5 of the size desired for the completed lens. In such case it is obviously immaterial whether there be anything in contact with the portion of the lens blank outside of the line of the annular edge 5 because such outside portion is to be cut away in any event. The vital point in all operations is that nothing be brought into contact with and no pressure be exerted upon any portion of the lens blank which is to form a part of a field of vision in the completed lens.

I claim:

1. The method of manufacturing lenses from lens blanks having one finished surface consisting of bringing the lens blank to a sufficiently molten condition to permit of the bending thereof, exerting, on the unfinished surface of the blank, pressure at the area desired to be bent and exerting counter-pressure on the finished surface of the blank, such counter-pressure being limited to points constituting a relatively thin line on the finished surface not within the confines of the field to be formed in the lens.

2. A device of the class described including a support for a lens blank having a relatively thin lens supporting edge defining a cavity therein and molding means for engaging the upper face of the lens blank when the blank is in a semi-molten condition whereby the lens may be depressed within the cavity of the supporting member.

3. A device of the class described including a lens-blank-supporting member having an annular sharp edge corresponding in shape to the confines of a field of vision desired to be formed in the lens and molding means adapted to engage the upper face of the lens blank when the blank is in a semi-molten condition, whereby to form a field in said lens blank having a curvature limited in area to the said annular edge.

4. A device of the class described including a supporting member having a concavity formed in its upper face, an annular edge surrounding said concavity, adapted to support a lens blank and a die plunger having a face smaller than the concavity in the support movable against the upper face of the lens blank to form a suitable surface on the lens limited by the annular edge of the support.

5. A device of the class described including a supporting member having a concavity in its upper face, an annular ridge surrounding said concavity, to support a lens blank, a guide plate adapted to be mounted upon the upper surface of the lens having an opening therethrough and a die plunger having a face smaller than the cavity of the supporting member movable through the opening and adapted to engage the upper surface of the lens blank when the latter is in a semi-molten condition to form a new surface thereon the annular edge of the supporting member limiting the curved surface produced by the plunger, as and for the purpose set forth.

6. A method of manufacturing lenses which comprises first finishing one face of the lens, heating the lens to a temperature permitting the bending thereof under pressure, and applying pressure through a die to the unfinished face of the lens, while supporting the lens on the finished side by a knife edge support adapted to limit the area operated upon by the die.

7. The method of manufacturing bifocal lenses which comprises forming a lens to one foci and finishing one face of the lens, heating the lens to a temperature permitting the bending thereof under pressure and applying pressure through a die to the unfinished face of the lens while supporting the lens on its finished face by a thin edge adapted to limit the area operated upon by the die, said thin edge being the only part to contact the finished face of the lens.

8. A device of the character described comprising a die member and a support for the lens, said support having a cavity of an area and depth greater than the face of the die and said cavity being limited by a relatively thin edge against which the finished face of the lens is adapted to rest.

9. The process of making a multifocal lens comprising grinding and polishing one face of a glass blank to a finished optical surface, and displacing a portion of said surface to a different curvature without changing the said optical surface by the application of directed pressure on the opposite side of the lens blank when the glass is in plastic condition under the action of heat.

In testimony whereof I affix my signature.

MICHAEL R. McDANAL.